T. MARTIN.
DONKEY ENGINE.
APPLICATION FILED MAR. 31, 1921.
1,435,722.
Patented Nov. 14, 1922.
2 SHEETS—SHEET 1.
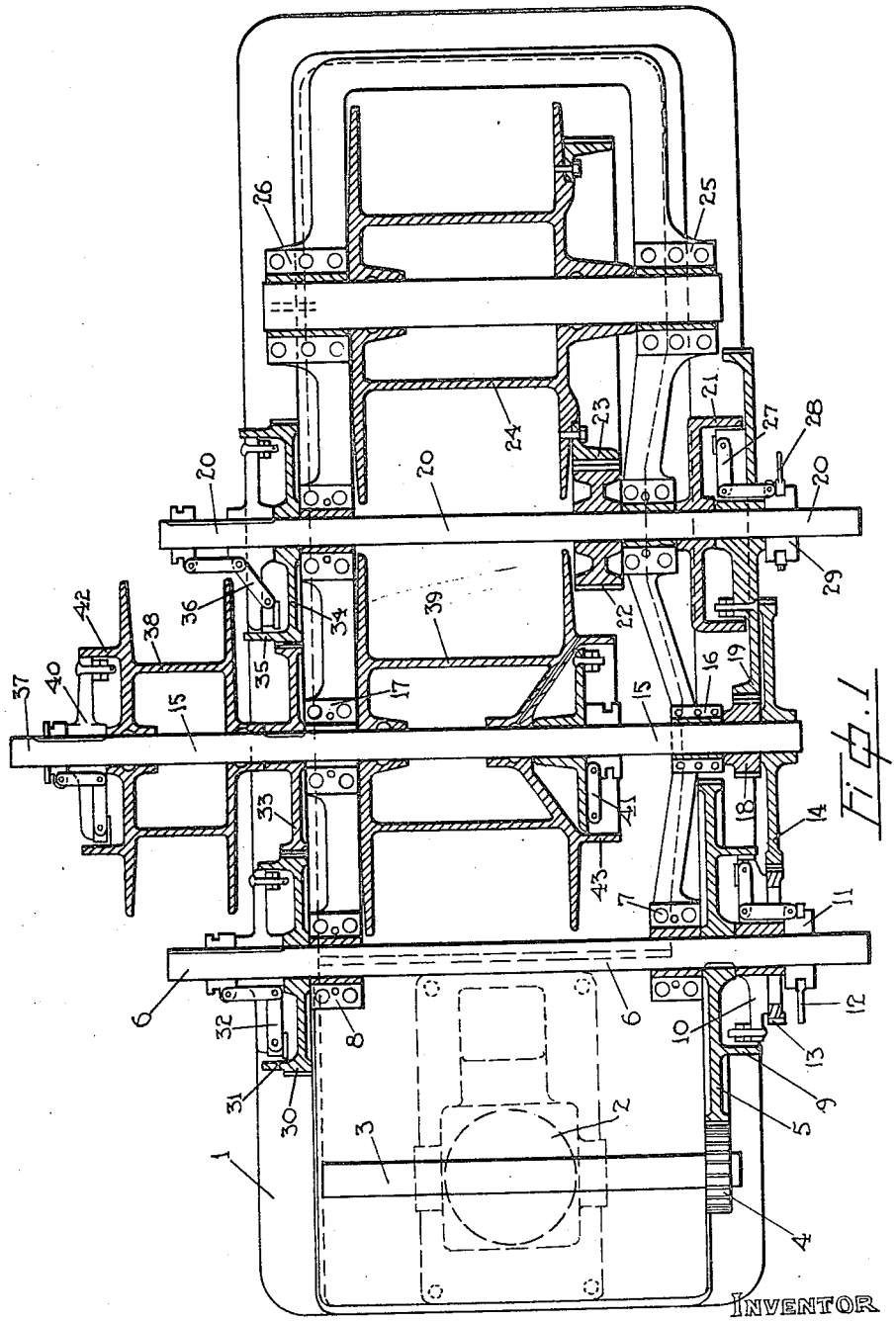
INVENTOR
THOMAS MARTIN
BY
ATTYS.

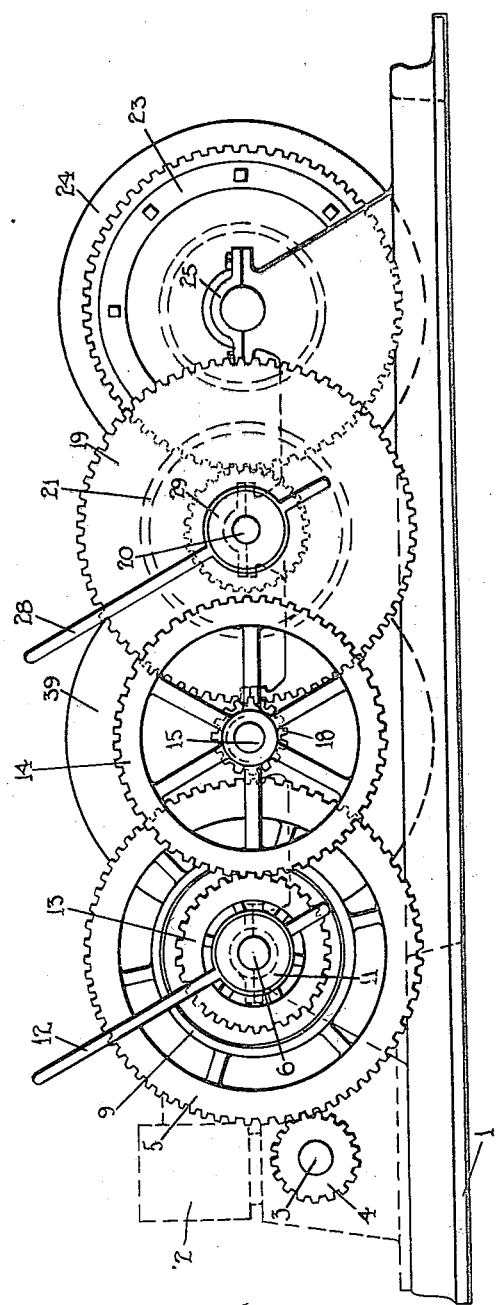

Patented Nov. 14, 1922.

UNITED STATES PATENT OFFICE.

1,435,722

THOMAS MARTIN, OF VANCOUVER, BRITISH COLUMBIA, CANADA.

DONKEY ENGINE.

Application filed March 31, 1921. Serial No. 457,295.

*To all whom it may concern:*

Be it known that I, THOMAS MARTIN, a subject of the King of Great Britain, and a resident of the city of Vancouver, in the Province of British Columbia, Canada, have invented certain new and useful Improvements in Donkey Engines, of which the following is a specification.

My invention relates to improvements in donkey engines, and the object of my invention is to devise a machine of this character adapted to be operated by an internal combustion motor and which has a more extended range of speeds and power than is found in such machines at the present time, which possesses great flexibility of operation and control, and which is very powerful, while at the same time the number of its parts is reduced to the minimum, thus enabling it to be assembled in comparatively small space without detracting from its strength and utility.

I attain this object by the construction illustrated in the accompanying drawings in which—

Fig. 1 is a sectional plan view of the machine.

Fig. 2 is a side elevation.

Similar figures of reference indicate similar parts throughout the views.

1 indicates the base plate of the machine on which is mounted towards one end any suitable type of internal combustion engine, indicated by the numeral 2, which operates the main power shaft 3, on which shaft at one end is secured a gear 4, which meshes with a large gear 5 secured to a transverse shaft 6 rotatably mounted in suitable bearings 7 and 8 formed on the base 1. The gear 5 is provided on its outer face with an annular rim 9 with which is adapted to co-operate a clutch 10 slidably mounted on the shaft 6, the clutch being capable of operation in the well known manner to engage the interior periphery of the rim or to be freed therefrom, a suitable collar 11 and co-operating handle 12 being provided for the actuation of the clutch. A gear 13 is formed on clutch 10 and this gear meshes with a larger gear 14 secured to a transverse shaft 15 rotatably mounted in bearings 16 and 17 while adjacent gear 14 on shaft 15 is a small fixed gear 18 which meshes with a larger gear 19 loosely mounted on an intermediate shaft 20, to which shaft is secured a brake drum 21 and a pinion 22, the pinion 22 meshing with a gear 23 secured to one end of a main winding drum 24 rotatably mounted in suitable bearings 25 and 26. Shaft 20, on which gear 19 is loosely mounted, may be rotated by means of a clutch 27 secured to the shaft, the clutch being adapted to be thrown into engagement with, or disconnected from, the inner periphery of the brake drum 21 by means of a suitable hand lever 28 engaging the clutch collar 29.

Loosely mounted on the opposite end of shaft 6 is a gear 30 provided with an annular rim 31 with the inner periphery of which a clutch 32 operatively connected to the shaft 6 is adapted to co-act so that the setting or release of the clutch connects or disconnects the gear 30 and the shaft 6. Gear 30 meshes with a gear 33 secured to the shaft 15, and this gear in turn meshes with a gear 34 loosely mounted on shaft 20, this gear being provided with an annular rim 35 so that it may be operatively connected to the shaft 20 by means of a clutch 36 connected to the shaft, as already described with reference to the other clutches. The end of shaft 15 is extended, as at 37, and on the extension is loosely mounted an extra drum 38, while intermediate its length the shaft is provided with a loosely mounted haulback drum 39, both of these drums, however, being adapted to be connected to the shaft to rotate therewith by means of suitable clutches, indicated by the numerals 40 and 41 respectively, and each of them is provided with a brake drum, 42 and 43 respectively, adapted to co-act with any suitable brake mechanism.

The manner in which the machine operates may be briefly described, each of the four speeds of the main drum being taken in turn and being identified by the 1st or lowest speed, 2nd and 3rd or intermediate speeds, and 4th or highest speed, it being, of course, understood that the respective gears are designed in accordance with the speeds and power required.

The 1st speed of the drum 24 is derived from the power shaft 3 on which is gear 4, the rotation of which rotates the gear 5. On setting clutch 10 to engage the rim 9 the clutch and its gear 13 are also rotated and as gear 13 meshes with gear 14 the shaft 15 and gear 18 are rotated, gear 18 rotating in turn gear 19 on shaft 20. Clutch 27 being set to engage brake drum 21, shaft 20 and pinion 22 are set in motion, and as pinion 22 meshes with the gear 23 on the drum 24, the drum is therefore rotated at the low speed, the number of revolutions per minute being in accordance with the designed gear ratios.

The 2nd speed of the drum 24, or one of the intermediate speeds, is obtained from gear 4 through gear 5, clutch 10, shaft 6, clutch 32, gear 30, gear 33, shaft 15, gear 18, gear 19, clutch 27, drum 21, shaft 20, gear 22 and gear 23 to the drum, while the 3rd speed, or the other intermediate speed, of the drum 24, is obtained from gear 4 through gear 5, shaft 6, clutch 10, gear 13, gear 14, shaft 15, gear 33, gear 34, clutch 36, shaft 20, gear 22, and gear 23 to the drum.

The 4th speed, or the highest speed, is derived from gear 4 which rotates gear 5 and shaft 6. Engaging clutch 32 with rim 31 causes gear 30 to rotate, which in turn rotates gears 33 and 34. Engaging clutch 36 with rim 35 causes rotation of shaft 20 and pinion 22, which in turn rotates gear 23 and the drum, so that the drum is then rotated at its highest speed.

The operation of the drums 38 and 39 are controlled by their respective clutches 40 and 41 so that they may be set in motion as required, drum 38 being used as an extra drum and 39 being used as a haulback drum for hauling the main line back to the point of hooking on the load, and it will be noted that both of these drums have two speeds, or the 1st and 2nd speeds already described which, with the four speeds of the main drum 24, gives to the machine a wide range of power and utility, while the arrangement of the mechanism enables a very compact device to be produced, so that it is of the greatest service in any operations in the carrying out of which it may be employed.

What I claim as my invention is:—

1. A donkey engine comprising a drive shaft, a main drum, an intermediate shaft driven from the drive shaft, two gears normally loose on the intermediate shaft, means for selectively clutching said gears to the intermediate shaft and means for selectively establishing a plurality of drive connections of different speed ratios between each gear and the drum whereby the latter may be driven at four different speeds.

2. A donkey engine comprising an intermediate shaft, a plurality of gears normally loose on said shaft, clutches for establishing fixed relation between the shaft and a selected gear, a haul-back drum shaft, gears fixed to said drum shaft and meshing with said first gears, an intermediate shaft, a gear normally loose on the intermediate shaft and meshing with one of the fixed gears on said drum shaft, an additional gear fixed to the drum shaft, a second gear loose on the intermediate shaft meshing with said additional gear, and a main winding drum driven from the intermediate shaft.

Dated at Vancouver, B. C., this 18th day of March, 1921.

THOMAS MARTIN.